UNITED STATES PATENT OFFICE.

GUSTAVE DOSSELMAN AND PERCY NEYMANN, OF CHICAGO, ILLINOIS, ASSIGNORS, BY MESNE ASSIGNMENTS, TO CHADELOID CHEMICAL COMPANY, OF NEW YORK, N. Y., A CORPORATION OF WEST VIRGINIA.

FINISH-REMOVER.

1,113,964.      Specification of Letters Patent.      Patented Oct. 20, 1914.

No Drawing. Original application filed June 24, 1903, Serial No. 162,885. Divided and this application filed April 8, 1907. Serial No. 366,907.

*To all whom it may concern:*

Be it known that we, GUSTAVE DOSSELMAN and PERCY NEYMANN, residents of Chicago, in the county of Cook and State of Illinois, have invented certain new and useful Improvements Relating to Finish-Removers, of which the following is a specification.

This invention relates to finish removers and relates especially to compositions comprising such solvents as alcohol and acetone, with which evaporation retarding material has been incorporated, for the removal from a surface of previously applied finish, such, for instance, as varnish, paint, enamel, shellac, gums and lacquers. In preparing such removers or compositions of matter of this general character for removing varnish and other finish from surfaces, paraffin, alcohol and acetone may for example be combined in proportions suitable to accomplish the desired result. A remover consisting of 45 pounds of paraffin, 135 gallons of alcohol and 137 gallons of acetone gives good results in practice when applied to the surface from which the finish is to be removed, thereafter removing simultaneously the dissolved finish and the remover from the surface. The solvents, that is the alcohol and acetone in this composition, attack and dissolve the varnish or other finish while the paraffin prevents the evaporation and drying of the solvents before the remover has completed its operation. While paraffin is preferably used as the evaporation retarding ingredient, which prevents the too rapid drying of the composition, other forms of wax or wax-like material may be used, such as a mineral wax, including the hydrocarbons akin to paraffin, vegetable wax, such as carnauba, or animal wax-like material, such as beeswax or fatty acids. It is to be understood that the term wax is used in the broad sense to include any of the above specified waxes or wax-like materials or equivalent evaporation retarding materials.

The composition may be made in liquid form by placing the alcohol in the receptacle or mixing tank and adding the paraffin or other wax retarding ingredient either in a melted condition or in the form of small particles after which the acetone is added. The remover may also be made in the form of a semi-paste, in which case ceresin wax is used in addition to the ingredients comprised in the liquid form of remover. A suitable semi-paste remover for practical conditions of operation may comprise 40 pounds of paraffin, 40 pounds of ceresin wax, 140 gallons of alcohol and 140 gallons of acetone. The semi-paste composition can be manufactured by first melting the paraffin and ceresin wax together and adding them to the alcohol and acetone or the waxes may be dissolved in the alcohol.

Having thus described the invention in this application, which is a divisional continuation of United States patent application, 162,885, filed June 24, 1903, which matured into Patent 1,014,211 on January 9, 1912, to which reference is made, in connection with a number of illustrative ingredients and formulas, to the details of which disclosure the invention is not, of course, to be limited, what is claimed as new and what is desired to be secured by Letters Patent is set forth in the appended claims:

1. The finish remover comprising approximately equal parts of alcohol and acetone with which several per cent. of waxy thickening material including paraffin has been incorporated thickening the remover to substantially semi-pasty consistency and effectively preventing excessive evaporation of the volatile material in the remover.

2. The substantially fluent finish remover consisting substantially of approximately equal parts of alcohol and acetone with which thickening material including paraffin has been incorporated increasing the consistency of the remover and effectively retarding excessive evaporation of the volatile material in the remover.

GUSTAVE DOSSELMAN
        PERCY NEYMANN.

Witnesses:
  LORETTO C. KENNY,
  DANIEL C. OPEALY.